Sept. 11, 1956 — P. P. RUPPE ET AL — 2,762,519
CONVEYOR ELEVATOR
Filed Feb. 25, 1952 — 3 Sheets-Sheet 1
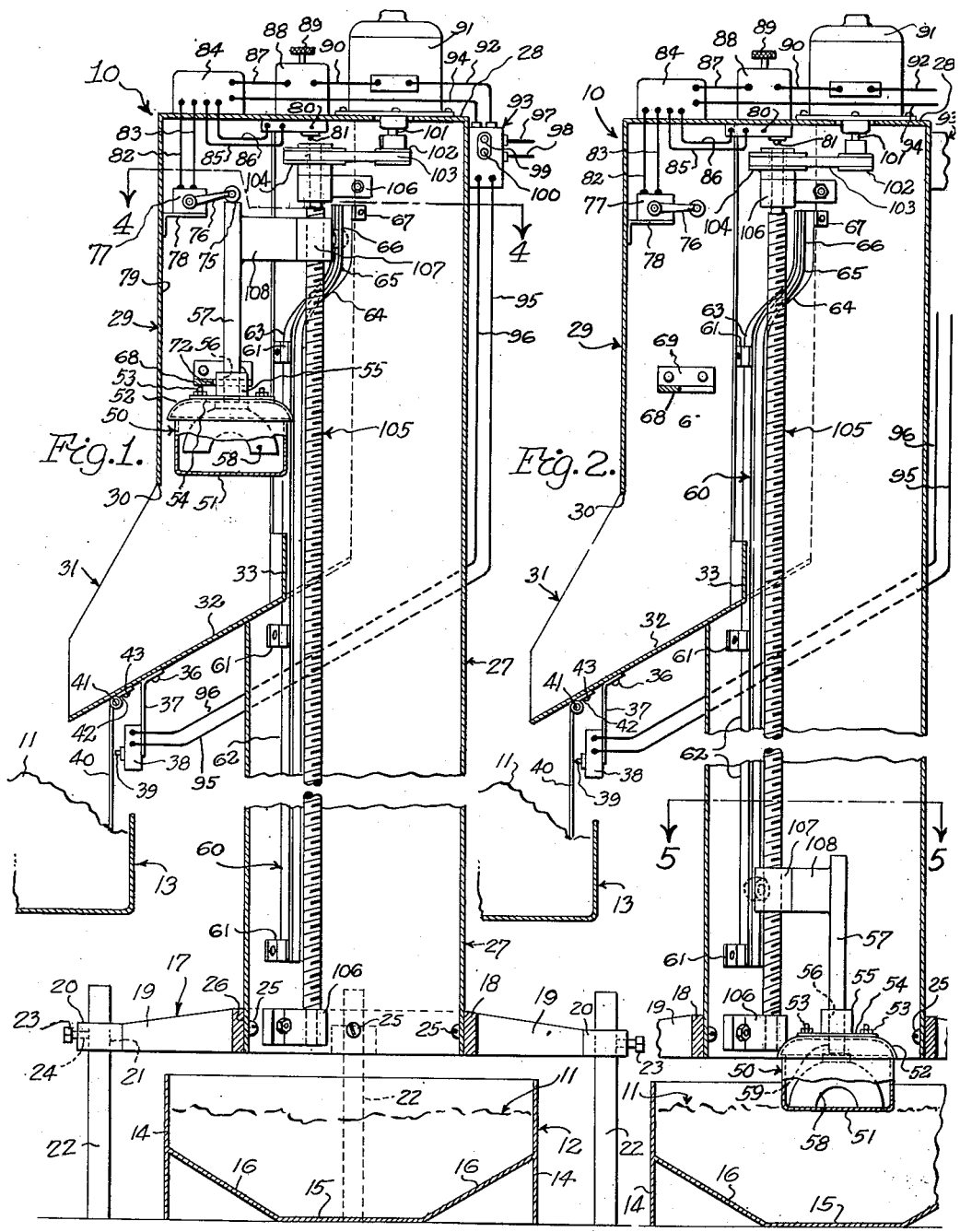
Inventor
Peter P. Ruppe
Alan E. Bodycombe
Barthel & Bugbee
Attorneys Sept. 11, 1956  P. P. RUPPE ET AL  2,762,519
CONVEYOR ELEVATOR
Filed Feb. 25, 1952.  3 Sheets-Sheet 2

Inventor
Peter P. Ruppe
Alan E. Bodycombe
By Barthel & Bugbee
Attorneys

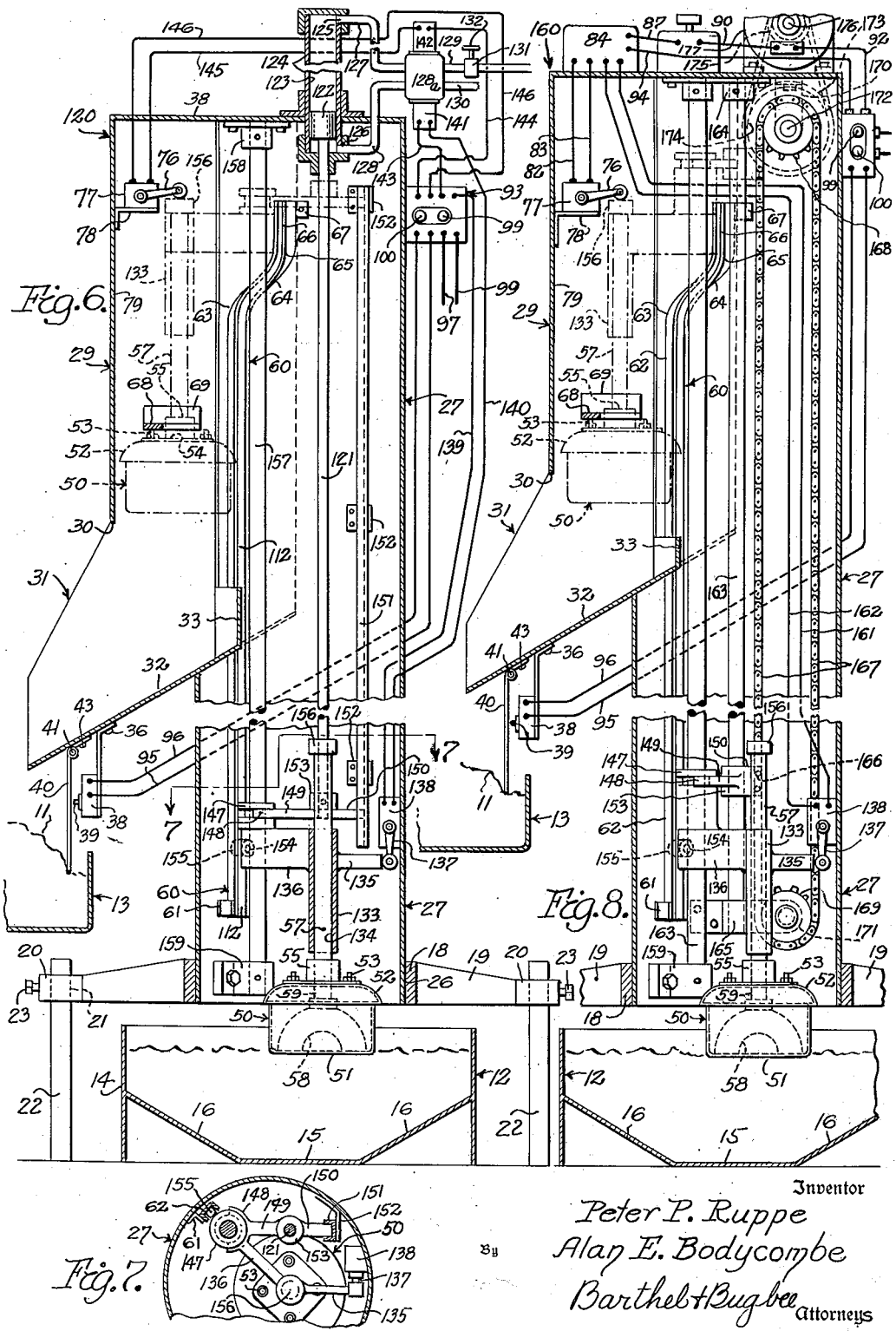

2,762,519
CONVEYOR ELEVATOR

Peter P. Ruppe and Alan E. Bodycombe,
Grosse Pointe Woods, Mich.

Application February 25, 1952, Serial No. 273,290

4 Claims. (Cl. 214—730)

This invention relates to conveyor elevators and, in particular, to a conveyor elevator for lifting small articles from a supply station at a lower level to a delivery station at a higher level, and discharging them at the higher level.

One object of this invention is to provide a conveyor elevator which automatically picks up small articles from a supply station such as a tote box or other supply receptable and carries them upward to a delivery station at a higher level where it discharges them into a discharge receptacle such as a chute, repeating the operation regularly until the tote box has been emptied.

Another object is to provide a conveyor elevator of the foregoing character in which the articles are wholly or partly of ferrous metal and the elevator has a magnet for picking up and carrying the articles.

Another object is to provide a conveyor elevator wherein the article carrier picks up and conveys measured quantities of the articles.

Another object is to provide a conveyor elevator of the foregoing character which is provided with variable compensating mechanism which automatically makes an allowance for the changing level in the tote box or supply receptacle, so that the article carrier always halts at the level of the articles in the supply receptacle and automatically reverses its motion, regardless of the changing level of the articles therein.

Another object is to provide a conveyor elevator of the foregoing character wherein an article pickup is elevated by various means, such as mechanically by a screw, by a fluid pressure operated motor, or by an endless power-transmitting member such as a sprocket chain.

Another object is to provide a conveyor elevator of the foregoing character wherein the article pickup at a predetermined location during its path of ascent is automatically moved laterally to a discharge station at a higher level but offset laterally from the supply station, and returned laterally to its original path at a predetermined location during its path of descent.

Another object is to provide a conveyor elevator wherein the elevated articles, after discharge, are received into a receptacle which is provided with a device which automatically halts the conveyor elevator at a predetermined level of the articles, thereby preventing overflow of the articles in the receiving receptacle.

Another object is to provide a conveyor elevator of the foregoing character which is arranged substantially vertically so as to occupy the minimum floor space and to operate with the minimum interference with adjacent activities.

Another object is to provide a conveyor elevator in which the speed of delivery of the conveyor elevator may be varied to suit individual conditions.

Other objects and advantages of the invention will become apparent during the course of the following description of the accompanying drawings, wherein:

Figure 1 is a central vertical section through a conveyor elevator in its discharging position, according to one form of the invention, employing an elevating screw, with the magnetic article pickup in its raised or discharging position and partly broken away to show the magnet in its raised position within the article carrier and with the central portion of the apparatus omitted to reduce the height of the drawing;

Figure 2 is a central vertical section through the conveyor elevator of Figure 1, but showing the article pickup in its lowered or loading position and partly broken away to show the magnet in its lowered position within the article pickup;

Figure 6 is a central vertical section through a modified conveyor elevator employing a fluid-pressure-operated elevating piston with the article pickup in its lowered or loading position;

Figure 7 is a fragmentary horizontal section taken along the line 7—7 in Figure 6; and Figure 8 is a central vertical section through a further modified conveyor elevator employing an endless flexible elevating member in the form of a sprocket chain, with the article pickup in its lowered or loading position.

Hitherto, in industrial establishments, the conveying of small parts or articles from a lower loading level to a higher discharge level has presented a difficult problem, particularly as regards the conveying of such articles in measured quantities. Another difficulty has been the problem of adjusting the rate of delivery of the conveyor to the varying demands of the machine or other article-consuming station so that the conveyor will deliver neither too few nor too many articles at a given time. Still another problem has been the difficulty of adapting the loading point of the conveyor to a varying level of the articles to be conveyed, or to a varying level of the articles discharged.

The present invention solves all of these problems by providing a conveyor elevator wherein the articles are picked up automatically by an article pickup which is provided with compensating mechanism permitting it to rise and fall in response to the rise and fall of the level of the articles in the supply receptacle at the loading station, to reverse itself automatically, to halt automatically at its elevated position and discharge the articles, and again to reverse automatically and travel downward to its loading position, repeating these operations indefinitely until halted by the operator or automatically by an excessive accumulation of articles at the discharge station. The article pickup for picking up ferrous metal articles is provided with a pickup magnet, and is automatically swung laterally to its discharge position when it reaches a predetermined location during its upward path of travel, and returned laterally to its original path at a predetermined position in its descent, the conveyor elevator being reversed automatically at the lower and upper positions of its travel so that it repeats its conveying and elevating operation repeatedly an indefinite number of times.

Screw-operated conveyor elevator

Figure 3:
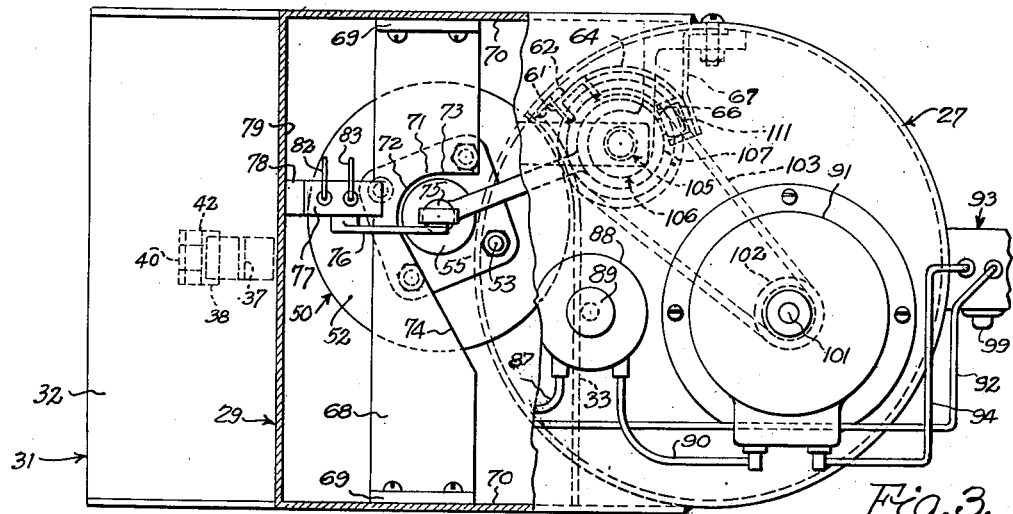
Figure 3 is an enlarged top plan view of the conveyor elevator of Figures 1 and 2, partly broken away to show the stop and limit switch mechanism.
Figure 4:
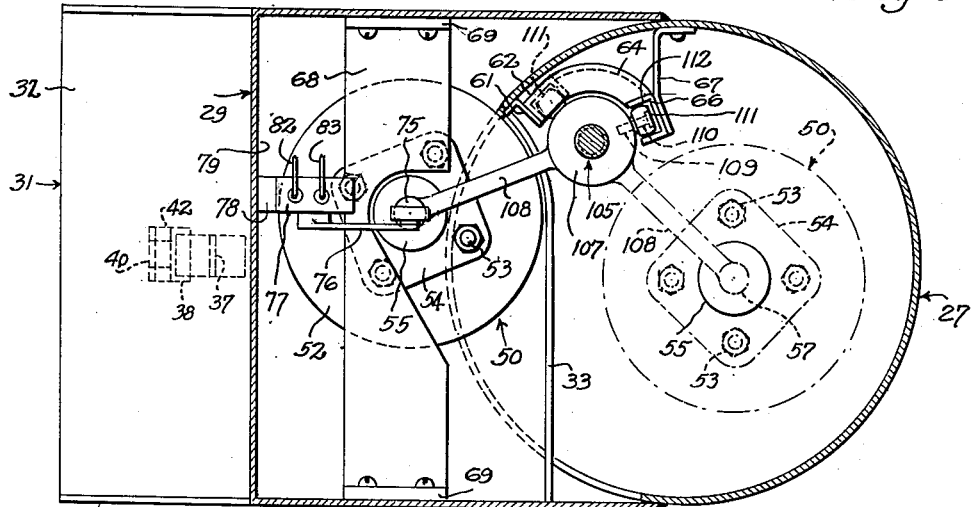
Figure 4 is a horizontal section taken along the line 4—4 in Figure 1 showing the channel cam for guiding and swinging the article pickup from its dotted line loading position to its solid line discharging position.
Figure 5:
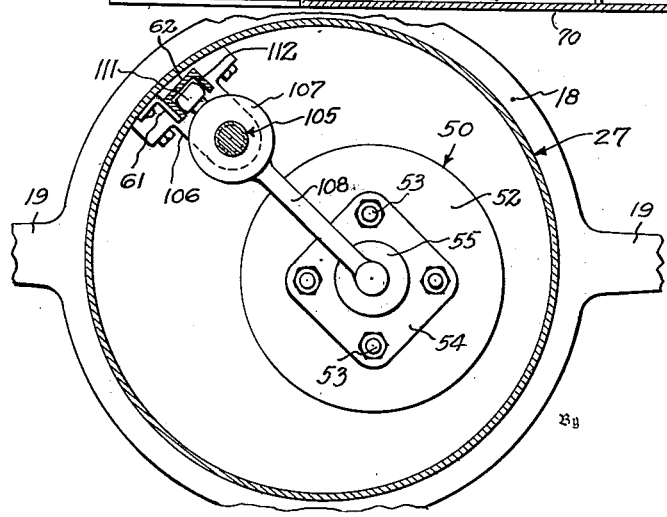
Figure 5 is a horizontal section taken along the line 5—5 in Figure 6, showing the channel cam and article pickup in the loading position.

Referring to the drawings in detail, Figures 1 to 5 inclusive show a conveyor elevator, generally designated 10, according to one form of the invention as arranged to pick up and elevate articles 11 of ferrous metal from a supply container or receptacle, generally designated 12, to a receiving or delivery container or receptacle, generally designated 13, located at a higher level. This supply container or receptacle 12 may be a tote box, as shown, or it may consist of a supply conveyor, such as a belt conveyor, or any other means by which the articles to be conveyed are brought into proximity to the conveyor elevator 10. As shown, the supply container or receptacle 12 is in the form of a tote box with sides 14 and a flat bottom 15 with sloping walls 16 extending from the sides 14 to the bottom 15 so as to cause the articles to slide downward toward the bottom 15.

The conveyor elevator 10 is provided with a base structure generaly designated 17 having an annular central portion 18 with arms 19 radiating outwardly therefrom to bosses 20 which are bored vertically as at 21 to slidably receive legs 22 held in position by set screws 23 threaded through holes 24 transversely to the bores 21. Secured as at 25 within the central bore 26 of the annular portion 18 is a tubular housing 27 which extends upward to the top of the machine and is there closed by a cover or top wall 28. The housing 27 has a laterally offset extension 29 with an opening 30 which receives a discharge spout 31 having a downwardly and outwardly inclined bottom wall 32, and a rear wall 33 located within the confines of the housing 27.

Secured as at 36 to the bottom wall 32 of the discharge spout 31 is a downwardly-extending bracket 37 carrying a conventional normally-closed discharge control switch 38 having an operating plunger 39 which is moved to open-circuit position by a laterally-swinging switch-operating arm 40 pivoted as at 41 to a bracket 42 secured as at 43 to the underside of the bottom wall 32 of the discharge spout 31. As discussed below in connection with the operation of the invention, the switch-operating arm 40 is swung to the right as the articles discharged from the spout 31 accumulate in a mound in the receiving container 13 and roll down the slope thereof against the switch-operating arm 40, swinging the latter into operating engagement with the switch-operating plunger 39 to open the switch 38 and halt the conveyor operation.

For purposes of illustration, the articles 11 are assumed to be of ferrous metal such as iron or steel, or of iron alloys and therefore magnetically attracted. For the purpose of picking up and carrying such ferrous metal articles, the conveyor elevator 10 is provided with a magnetic article pickup, generally designated 50, which includes a cup-shaped non-magnetic casing 51 secured to a cover 52 which in turn is bolted or otherwise secured as at 53 to a plate or disc 54 having a central hub or boss 55 provided with a bore 56 which loosely and slidably receives a rod or shaft 57 carrying a permanent magnet 58 on its lower end 59.

The rod 57 is variously connected and carried upward in the three different forms of the conveyor elevator shown in Figures 1, 6 and 8, and hence these connections are separately described in connection with each of these figures. In each case, however, the article pickup 50 is guided in its upward travel or ascent and also swung laterally at the top of its travel by a channel cam, generally designated 60, and attached by angle brackets 61 to the inner surface of the housing 27 at intervals during its extent. The channel cam 60 is provided for the greater part of its height with a straight or rectilinear portion 62 at the top 63 of which it continues in a curved or helical portion 64 and at a higher turning point 65 continues again upward in a straight or rectilinear portion 66. The curved or helical portion 64 (Figure 4) is of sufficient extent circumferentially to swing the article carrier 50 laterally to the desired extent, the extent shown for purposes of illustration in Figures 1 to 5 inclusive being approximately a third of a revolution. The top portion 66 is secured to the housing 27 by an elongated angle bracket 67.

In order to limit the vertical travel of the article pickup 50 and its rod 57, a stop bar 68 is bolted or otherwise secured at its opposite ends 69 (Figures 3 and 4) to the inside of the side walls 70 of the housing extension 29. The stop bar 68 is provided with a cutaway portion or notch 71 having an approximately quarter-circular or arcuate central portion 72 (Figures 3 and 4) approached by straight end portions 73 and 74 tangential thereto and arranged at an acute angle to one another. The quarter-circular portion 72 is of a radius of curvature slightly greater than the radius of curvature of the hub or boss 55 so as to provide clearance of the latter during its ascent, until one of the bolts 53 engages the underside of the stop bar 68 and halts the ascent of the article carrier 50, as described in connection with the operation of the invention. When this occurs, the upper end 75 of the rod 57 engages and pushes upward the operating arm 76 of an upper motor-reversing switch 77 mounted on an angle bracket 78 secured to the inside of the front wall 79 of the casing extension 29.

Mounted on the underside of the cover or top wall 28 is a lower reversing switch 80 having a downwardly-extending plunger 81. The upper reversing switch 77 is connected by wires 82 and 83 to a motor control switch 84 which it actuates, whereas the lower reversing switch 80 is similarly connected by wires 85 and 86 thereto for reversing the downward travel of the article pickup 50 at the lowermost part of its stroke, as set forth in connection with the operation of the invention. The switches 77, 80 and 84 are conventional and well-known and their details form no part of the invention.

Also mounted on the cover or top wall 28 and connected to the motor control switch 84 by the wire 87 is a conventional motor speed controller 88 regulated by a hand wheel 89 and connected by the wire 90 to a vertical electric motor 91 which in turn is connected by a wire 92 to the starting and stopping switch box 93 or push button switch station, which is also directly connected to the motor control switch 84 by the wire 94. The starting and stopping switch 93 is also connected by wires 95 and 96 to the discharge control switch 38, and is supplied with electric current from the wires 97 and 98 connected to an external source of current. The motor speed controller 88 and the starting and stopping switch 93 are likewise conventional and their details likewise form no part of the present invention. The starting and stopping switch 93 is provided with the usual starting and stopping push buttons 99 and 100 respectively by which the motor 91 is started and stopped manually through the action of the electric current just described.

The motor 91 is provided with a drive shaft 101 extending downwardly through the cover or top wall 38 of the housing 27 and on its lower end carries a drive pulley 102 connected by a belt or other power-transmission element 103 to a driven pulley 104 mounted upon the upper end of a screw shaft 105. The upper and lower ends of the screw shaft 105 are unthreaded and are supported not only for rotation by a pair of bearing brackets 106 located respectively near the upper and lower ends of the screw shaft 105, but also for a slight amount of vertical or axial reciprocation in order to operate the lower reversing switch 80 by engaging the switch plunger 81 thereof, as explained below in connection with the operation of the invention. The screw shaft 105 is threaded throughout the major portion of its length, and upon it is mounted the threaded nut or hub 107 on the inner end of an arm 108 connected at its outer end to the rod 57 which supports the article pickup 50 on its lower end. The hub or nut 107 is provided with a socket 109 (Figure 4) in which is seated a pivot pin or stud 110 carrying a roller 111 which travels in the groove or channel 112 of the channel cam 60.

In the operation of the screw-operated conveyor elevator 10 shown in Figures 1 to 5, inclusive, the supply container 12 is provided with ferrous metal articles 11 which it is desired to elevate and convey to the receiving container 13, for example, internal combustion engine valves which are to be ground in a grinding machine. The filled supply container 12 is then inserted beneath the lower end of the housing 27 or, if it consists of a moving conveyor, the latter is trained to pass beneath the lower end of the housing 27 so as to carry the conveyed articles past the latter. The operator then presses the starting button 99, starting the shaft 101 of the motor 91 in rotation and consequently rotating the screw shaft 105 in a forward direction, causing the hub or nut 107 to be carried downward, taking with it the article pickup 50. As the threaded hub 107 travels downward, the roller 111 follows the curving channel or groove 112 of the helical portion 64 of the channel cam 60, swinging the arm 108, the rod 57 and the article carrier 50 through a partial revolution into the dotted line position of Figure 4 substantially in the center of the housing 27 whereupon the roller 111 encounters the straight portion 62 of the channel cam 60 and thereafter descends in a straight path.

When the article pickup 50 has thus been lowered until its non-magnetic casing 51 engages the articles 11, the casing 51 halts, but the rod 57 and the pickup magnet 58 carried by it continue to be carried downward by the nut 107 and arm 108 until the magnet 58 comes to rest against the bottom of the casing 51 and can move no further. Since thread 57, arm 108 and nut or threaded hub 107 can move no farther downward, the continued rotation of the screw shaft 105 causes the screw shaft itself to move upward in its bearing brackets 106, causing the upper end of the screw shaft 105 to engage the switch plunger 81 and operate the reversing switch 80 to reverse the direction of rotation of the motor 91. Meanwhile, the descent of the magnet 58 to a position against the bottom of the casing 51 causes its magnetic field to be brought into close proximity to the ferrous metal articles 11 to be conveyed, causing them to adhere to the casing 51.

The reverse rotation of the screw shaft 105 brought about by the reversal of the driving motor 91 to the operation of the lower reversing switch 80 by the rising of the screw shaft 105 in its bearing brackets 106, causes the threaded hub or nut 107, arm 108 and rod 57 to travel upward from the position shown in Figure 2, to that shown in Figure 1, carrying with them the magnet 58, casing 51 and a specific number of the ferrous metal articles 11 determined by the magnetic force exerted by the magnet 58 and the weight of each article 11. Articles in excess of this specific number will drop off as the article pickup 50 rises, due to the inability of the magnet 58 to lift a load beyond its capacity.

As the article pickup 50 moves upward out of contact with the articles 11 remaining in the supply receptacle, 12, the rod 57, arm 108 and threaded hub or nut 107 cease to support the screw shaft 105 in its raised position, whereupon it drops downward slightly until its upper end moves out of engagement with the operating plunger 81 of the lower reversing switch 80. The screw shaft 105, however, continues to rotate in a reverse direction, and the roller 111 travels upward in the channel 112 of the channel cam 60, swinging the arm 108 from the dotted line position (Figure 4) to the solid line position when the roller 111 reaches and traverses the helical portion 64 of the channel cam 60. Thus swung, the arm 108 and its associated parts, including the article pickup 50 and rod 57, continue to move upward in a straight path as the roller 111 traverses the upper straight portion 66 of the channel cam 62.

When the screws 53 encounter the stop bar 68 (Figures 1, 3 and 4), they halt the non-magnetic pickup casing 51 to which they are attached. The rod 57 and the magnet 58 attached to it, however, continue to be moved upward by the upwardly travelling arm 108 and threaded hub 107, pulling the pickup magnet 58 away from the bottom of the pickup casing 51 and accordingly decreasing the strength of the magnetic field at the bottom of the casing 51 in accordance with the well-known inverse square law of magnetic force. This reduction in the magnetic force causes the conveyed articles to drop off the casing 51 of the article pickup 50 and to fall downward through the spout 31 into the receiving container 13 where they accumulate in a heap. Meanwhile, the rod 57 is moved upward until its upper end 75 shifts the operating arm 76 of the upper reversing switch 77, reversing the direction of rotation of the motor 91 and screw shaft 105 and consequently causing the threaded hub or nut 107, arm 108, rod 57 and article pickup 50 again to descend, repeating the foregoing operation automatically until halted by the operator or by the discharge control switch 38.

The discharge control switch 38 is operated when the conveyed articles 11 accumulate to such a height in the receiving container 13 that they tumble downward along the sides of the heap until they push against the swinging arm 40 to actuate the plunger 39 of the discharge control switch 38, independently operating the starting and stopping switch 93 to halt the motor 91. This arrangement prevents the undesired accumulation of an excessive number or quantity of conveyed parts in the receiving container 13. When, however, the level of the parts 11 in the receiving container 13 drops below the lower end of the arm 40, it swings to the left, releasing the switch plunger 39 and permitting the motor 19 to restart and continue the operation of the conveyor elevator 10 in the manner previously described. In place of the reversible motor 91, it will be obvious that a conventional reversing gearbox or other reversing mechanism and a non-reversible motor may be substituted.

*Piston-operated conveyor elevator*

The modified conveyor elevator, generally designated 120, shown in Figures 6 and 7 is in many respects identical in construction with the conveyor elevator 10 shown in Figure 1, hence similar parts are designated by similar reference numerals. In Figure 6, however, the article pickup 50 is moved upward and downward by means of a piston 121 having a piston head 122 reciprocable vertically within the bore 123 of a hydraulic or pneumatic cylinder 124 having pressure-fluid service ports 125 and 126 near its opposite ends. The service ports 125 and 126 are connected by pipes 127 and 128 respectively to the corresponding port of a conventional four-way valve 128a having a pressure fluid pipe 129 and a fluid discharge pipe 130 connected thereto. A control valve 131 having a hand wheel 132 regulates the supply of pressure fluid to the valve 128a and consequently regulates the speed of reciprocation of the piston 121.

Slidably mounted on the rod 57 which carries the magnet 58 of the article pickup 50 and reciprocable relatively thereto is a sleeve or hub 133 having a bore 134 therethrough for receiving the rod 57. Projecting radially in opposite directions from the sleeve 133 are integral arms 135 and 136 respectively. The arm 135 actuates the operating arm 137 of a lower reversing switch 138 which is connected by one wire 139 to the starting and stopping switch 93 and by another wire 140 to one of the two operating solenoids 141 and 142 of the four-way valve 128. The remaining terminal of the solenoid 141 and one of the terminals of the solenoid 142 are connected respectively by wires 143 and 144 to the starting and stopping switch 93. The remaining terminal of the solenoid 142 is connected by a wire 145 to the upper reversing switch 77, the remaining wire 148 of which runs back to the starting and stopping switch 93. The starting and stopping switch 93, as before, is supplied with electric current through the wires 97 and 99.

The arms 135 and 136, sleeve 133 and rod 57 mounted therein, together with the article carrier or pickup 50 are raised and lowered by an annularly-grooved shift collar 147 mounted on the upper side of the arm 136 and engaged by the forked end 148 (Figure 7) of a cross head 149, the opposite end 150 of which moves vertically in a straight vertical guide channel 151 mounted on brackets 152 secured to the inside wall of the casing 27. The crosshead 149 near its midportion carries a boss 153 which is bored to receive the lower end of the piston rod 121 which is pinned or otherwise secured thereto. Seated in the outer end of the arm 136 is a pin 154 carrying a roller 155 which, like the roller 111 of Figure 4, engages the groove or channel 112 in the channel cam 60 and is guided thereby in its ascent and descent. The rod 57 and its associated article pickup 50 are substantially the same as those shown in Figure 1, with the exception that a collar or other enlargement 156 is provided at the upper end of the rod 57 for engagement by the upper end of the sleeve 133 so as to lift the rod 57 and its associated parts, including the article pickup 50.

In order to further guide the article pickup 50 in its ascent and descent, the grooved shift collar 148 is bored to receive and slide freely up and down upon a guide shaft or guide rod 157, the upper and lower ends of which are mounted in brackets 158 and 159 respectively bolted to the housing 27 and cover 38 thereof (Figure 6).

In the operation of the modified conveyor elevator of Figures 6 and 7, the operator starts the apparatus in operation by pressing the starting push button 99 of the starting and stopping switch 93, as before. This action, however, energizes the solenoid 141 to cause the valve 128a to deliver pressure fluid from the pressure fluid supply line 129 (which leads to a conventional pump or other source of pressure fluid, not shown) to the service pipe 128 and service port 126 at the lower end of the cylinder 124. The pressure fluid thus acting beneath the piston head 122 moves the latter upward in the cylinder bore 123, raising the piston 121 and the cross head 149 attached to it. At the same time, fluid is discharged through the port 125 and upper service pipe 127 from the space above the piston head 122.

The upward motion of the cross head 149 conveys upward motion to the arms 136 and 135 and sleeve 133 through the engagement of the forked end 148 with the grooved shift collar 147, withdrawing the arm 135 from engagement with the operating arm 137 of the reversing switch 138. The sleeve 133 moves upward until it engages the enlargement or collar 156 on the upper end of the rod 57, lifting the latter and with it the article pickup 50 and the articles on the bottom of the pickup casing 51 attracted by the magnet 58. This assembly moves upward with the roller 155 engaging the straight portion 62 of the channel cam 60 until it reaches the point 63, after which the roller 155 traverses the helical cam portion 64 to swing the arms 135 and 136 and sleeve 133 around the guide shaft 157 and collar 147 as an axis, bringing the article pickup 50 into the dotted line position shown in the upper left-hand corner of Figure 6.

As before, the pickup casing 51 halts when its screws 53 encounter the stop bar 68 but the rod 57 and magnet 58 continue to be pulled upward by the still rising arm 136 and sleeve 133, with the roller 155 now traversing the straight portion 66 of the channel cam 60. As before, this draws the magnet 58 away from the bottom of the pickup casing 51 with the effect of diminishing its magnetic force on the conveyed articles 11 so that again they drop into the spout 31. When the upper end of the rod 57 encounters the operating arm 76 of the upper reversing switch 77 it actuates this switch to energize the solenoid 152 and reverse the position of the four-way valve 128a. This action causes pressure fluid to be admitted through the upper service pipe 127 and port 125 to the upper end of the cylinder bore 123, moving the piston 122 downward while fluid is discharged through the lower port 126 and lower service pipe 128.

As the piston 121 moves downward, it carries with it the cross head 149, shift collar 147, arm 136, sleeve 133, rod 57 and article pickup 50, swinging this assembly from the dotted line position in the upper portion of Figure 6 to the solid line position in the lower portion thereof. As the arm 135 reaches the lower reversing switch 138, it actuates the operating lever 137 thereof to energize the solenoid 141 and de-energize the solenoid 142, reversing the valve 128a and consequently causing the piston head 122, piston 121, cross head 149 and article pickup 50 to move upward as before. Meanwhile, however, before the sleeve 133 reached its lowermost position, the bottom of the article pickup casing 51 had come to rest upon the ferrous metal articles 11 in the supply container 12 while the magnet 58 continued to move downward, bringing its magnetic field to bear upon the articles 11. Consequently, when the article pickup 50 again rises, it carries with it a specific number of articles 11 as before. The operation of elevating and discharging the articles 11 then proceeds in a manner analogous to that described in connection with Figure 1, with halting of the apparatus brought about by the arm 40 and the discharge control switch 38 in the manner previously described.

*Chain- or belt-operated conveyor elevator*

The modified conveyor elevator 160 shown in Figure 8 is in many respects a composite of the conveyor elevators 10 and 120 of Figures 1 and 6 respectively, and parts identical in construction with the conveyor elevators 10 and 120 shown in Figures 1 and 6 are designated by similar reference numerals in Figure 8. As regards the raising and lowering of the article pickup 50, the mechanism in Figure 8 and the guiding arrangement is generally similar to parts of Figure 6 and also bear similar reference numerals and require no repetition. In Figure 8, the article pickup 50 is also connected to a rod 57 with an enlargement 156 on the upper end thereof and also slidably mounted in the sleeve 133 likewise having arms 136 and 135. As in Figure 6, the arm 135 actuates the operating arm 137 of the lower reversing switch 138 but here the wires 161 and 162 proceed directly to the control switch 84 in a manner similar to the wires 85 and 86 of the lower reversing switch 80 in Figure 1. As in Figure 6, the arm 136 carries a grooved shift collar 147 acted upon by the forked end 148 of a cross head 149, but the hub or boss 153 thereof is bored to slide up and down vertically upon a guide shaft 163 mounted at its upper and lower ends in brackets 164 and 165 attached respectively to the cover 38 and housing 27. The arm 150 of the cross head 149 instead of being moved up and down by a piston 121 as in Figure 6, is connected as at 166 to an endless belt or sprocket chain 167 which is mounted at its upper and lower ends on sprocket wheels or pulleys 168 and 169 rotatably supported in bearing brackets 170 and 171 bolted to the cover 38 and housing 27 respectively. The axle or shaft 172 upon which the sprocket 168 is mounted carries a pulley or sprocket 173 which is connected by a belt or sprocket chain 174 to a pulley or sprocket 175 on the drive shaft 176 of a horizontal motor 177. The remainder of the connections of the motor 177 and the electrical circuit controlling it are substantially the same as that previously described in connection with Figure 1.

The operation of the conveyor elevator 160 is in most respects similar to that of the conveyor elevator 10 of Figure 1, except that the actual raising and lowering of the article pickup 50 is similar to that of the conveyor elevator 120 of Figure 6. Instead of the cross head 149 being moved up and down by the piston 121, it is moved up and down by the sprocket chain or belt 167, the reversible motor 177 being reversed at the opposite limits of travel of the cross head 149 by the upper and lower reversing switches 77 and 138 respectively. The operation of the discharge control switch 38 is also the same as that previously described in connection with Figure 1, hence requires no repetition.

Thus, in all three forms of the invention, the article pickup 50 picks up and conveys ferrous metal parts regardless of the level of the articles 11 in the supply container 12 and automatically compensates for the rise and fall of that level.

In place of the magnetic pickup 50 described above, it will be obvious that a suction pickup or mechanical grasping device or hook may be substituted, especially for handling non-magnetically-attracted articles of non-ferrous metals or of non-metallic materials.

What I claim is:

1. A conveyor elevator for lifting articles from a supply station at a low level to a laterally offset delivery station at a higher level, said conveyor elevator comprising a substantially upright supporting structure positioned above said supply station, an article pickup elevator unit connected to said supporting structure and movable in a substantially vertical path, an article pickup carrier unit connected to said elevator unit and movable upward and downward thereby, said carrier unit being mounted on said elevator unit for lateral movement relatively thereto, an article pickup unit mounted on said carrier unit for travel therewith, a motor drivingly connected to said elevator unit, and mechanism responsive to the travel of said carrier unit to a predetermined height above said supply station for moving said carrier unit laterally relatively to said elevator unit toward said delivery station, said elevator unit including a pair of vertically-spaced wheels rotatably mounted on said supporting structure, and an endless flexible conveyor member mounted on said wheels, said motor being drivingly connected to one of said wheels, and said carrier unit being connected to said conveyor member.

2. A conveyor elevator for lifting articles from a supply station at a low level to a laterally-offset delivery station at a higher level, said conveyor elevator comprising a substantially upright supporting structure positioned above said supply station, an article pickup elevator unit connected to said supporting structure and movable in a substantially vertical path, an article pickup carrier unit connected to said elevator unit and movable upward and downward thereby, said carrier unit being mounted on said elevator unit for lateral movement relatively thereto, an article pickup unit mounted on said carrier unit for travel therewith, a motor drivingly connected to said elevator unit, and mechanism responsive to the travel of said carrier unit to a predetermined height above said supply station for moving said carrier unit laterally relatively to said elevator unit toward said delivery station, said elevator unit including a sprocket wheel rotatably mounted in the upper portion of said supporting structure, a sprocket chain meshing with said sprocket wheel and extending downwardly therefrom to the lower portion of said supporting structure, said motor being drivingly connected to said sprocket wheel, and means operatively connecting said carrier unit to said sprocket chain to rise and fall therewith in response to the rotation of said sprocket wheel by said motor.

3. A conveyor elevator for lifting articles from a supply station at a low level to a laterally-offset delivery station at a higher level, said conveyor elevator comprising a substantially upright supporting structure positioned above said supply station, an article pickup elevator unit connected to said supporting structure and movable in a substantially vertical path, an article pickup carrier unit connected to said elevator unit and movable upward and downward thereby, said carrier unit being mounted on said elevator unit for lateral movement relatively thereto, an article pickup unit mounted on said carrier unit for travel therewith, a motor drivingly connected to said elevator unit, and mechanism responsive to the travel of said carrier unit to a predetermined height above said supply station for moving said carrier unit laterally relatively to said elevator unit toward said delivery station, said supporting structure including a vertical guide rod, said article pickup carrier unit being slidably mounted for vertical reciprocation along said guide rod, said elevator unit including a sprocket wheel rotatably mounted in the upper portion of said supporting structure, a sprocket chain meshing with said sprocket wheel and extending downwardly therefrom to the lower portion of said supporting structure, said motor being drivingly connected to said sprocket wheel, and means operatively connecting said carrier unit to said sprocket chain to rise and fall therewith in response to the rotation of said sprocket wheel by said motor.

4. A conveyor elevator for lifting articles from a supply station at a low level to a laterally-offset delivery station at a higher level, said conveyor elevator comprising a substantially upright supporting structure positioned above said supply station, an article pickup elevator unit connected to said supporting structure and movable in a substantially vertical path, an article pickup carrier unit connected to said elevator unit and movable upward and downward thereby, said carrier unit being mounted on said elevator unit for lateral movement relatively thereto, an article pickup unit mounted on said carrier unit for travel therewith, a motor drivingly connected to said elevator unit, and mechanism responsive to the travel of said carrier unit to a predetermined height above said supply station for moving said carrier unit laterally relatively to said elevator unit toward said delivery station, said supporting structure including a pair of spaced parallel vertical guide rods, said article pickup carrier being slidably mounted for vertical reciprocation along said guide rods, said elevator unit including a sprocket wheel rotatably mounted in the upper portion of said supporting structure, a sprocket chain meshing with said sprocket wheel and extending downwardly therefrom to the lower portion of said supporting structure, said motor being drivingly connected to said sprocket wheel, and means operatively connecting said carrier unit to said sprocket chain to rise and fall therewith in response to the rotation of said sprocket wheel by said motor.

References Cited in the file of this patent

UNITED STATES PATENTS

| | | |
|---|---|---|
| 2,394,552 | Kelly | Feb. 12, 1946 |
| 2,430,407 | Nelson | Nov. 4, 1947 |
| 2,609,108 | Peterson et al. | Sept. 2, 1952 |
| 2,665,013 | Socke | Jan. 5, 1954 |